United States Patent [19]

Harrison

[11] Patent Number: 4,549,349
[45] Date of Patent: Oct. 29, 1985

[54] CUTTING APPARATUS

[76] Inventor: Stuart M. Harrison, 223 London Rd., East Grinstead, Sussex, England

[21] Appl. No.: 671,435

[22] Filed: Nov. 14, 1984

Related U.S. Application Data

[63] Continuation of Ser. No. 430,019, Sep. 30, 1982.

[30] Foreign Application Priority Data

Oct. 7, 1981 [GB] United Kingdom ............ 8130277

[51] Int. Cl.⁴ ............... B23D 21/06; B26B 13/06; B26B 17/00
[52] U.S. Cl. ............................ 30/92; 30/134; 30/254
[58] Field of Search ............ 30/92, 134, 228, 254, 30/257, 259, 287, 292, 180, 196; 144/34 E; 83/692, 693, 694, 916

[56] References Cited

U.S. PATENT DOCUMENTS

| | | | |
|---|---|---|---|
| 2,249,515 | 7/1941 | Carroll | 30/254 |
| 2,791,028 | 5/1957 | Bidin | 30/228 |
| 2,794,250 | 6/1957 | Bethune | 30/254 |
| 2,870,538 | 1/1959 | Townshend, Jr. | 30/254 |
| 3,012,321 | 12/1961 | Townshend, Jr. | 30/254 |
| 4,283,851 | 8/1981 | Wolter | 30/228 |
| 4,392,263 | 7/1983 | Amoroso | 30/134 |

FOREIGN PATENT DOCUMENTS 3028370  7/1980  Fed. Rep. of Germany ........ 30/92

Primary Examiner—Paul A. Bell
Assistant Examiner—Paul M. Heyrana, Sr.
Attorney, Agent, or Firm—Murray, Whisenhunt and Ferguson

[57] ABSTRACT

A pair of cutter blades is provided for cutting sheet metal in flat tubular form. The blades are pivotally connected together in scissors-fashion so as to be capable of relative movement between each other. At least one of the blades is formed with a cutting edge comprising a piercing point or region having on each side portions which trail the leading extremity of the piercing point or region considered in the direction of cutting, whereby in operation after initial piercing of the metal to be cut, and on continued cutting, the incision made by the piercing point or region increases away from the pierced region towards the sides of the material being cut. The blades may be operated by means of a piston and cylinder device driving a pair of links connecting the piston to the two blades at positions off-set from the pivotal axis of the two blades.

7 Claims, 7 Drawing Figures

CUTTING APPARATUS

This is a continuation application of Ser. No. 430,019, filed Sept. 30, 1982.

BACKGROUND TO THE INVENTION

This invention relates to apparatus for shearing material in flat, tubular or rod form and more especially but not solely for exhaust pipes.

For the purpose of the replacement of exhaust systems in motor vehicles the need has arisen for speedy removal of exhaust pipes prior to fitting replacement parts. The pipes are generally from 31 mm. to 58 mm. in diameter having a wall thickness of 16 S.W.G.

STATEMENT OF PRIOR ART

Attempts were made to use well known hand operated cutting implements often termed bolt-croppers. These were found to be unsuccessful since after the initial difficulty of gripping the pipe was overcome the latter merely flattened, presenting to the cropper blades a double wall thickness joined by a bend which resisted shearing. Shears having part-circular cutting edges were found to be similarly unsatisfactory.

It was evident that insufficient power was being transmitted to the cutter blades to overcome the resistance offered by the fold at the initiation of the cutting operation. Attention was, therefore, turned to hydraulic power. Two devices were considered namely a cable cutter and a pillar cutter for emergency use on vehicles. Whilst these were amply capable of cutting through exhaust pipes they were extremely heavy pieces of equipment quite unsuitable for easy manipulation by a mechanic working beneath a vehicle.

OBJECT OF THE INVENTION

An object of the invention is to provide cutter blades which permit ease of use of a hand held tool for the purpose of cutting sheet metal, especially exhaust pipes of motor vehicles.

The inventor decided to approach the problem from the point of view of blade design. It occurred to him that if the blades could be made to pierce the tube less power would be needed to effect a shearing action.

SUMMARY OF THE INVENTION

According to the invention there is provided a pair of cutter blades for relative movement between each other for cutting sheet metal in flat, tubular or rod form, wherein at least one of said blades is formed with a cutting edge comprising a piercing point or region having on each side portions which trail the leading extremity of the piercing point or region considered in the direction of cutting, whereby in operation after initial piercing of the material to be cut, and on continued cutting, the incision made by the piercing point or region increases away from the pierced region towards the sides of the material being cut.

Preferably the blades are pivotally mounted as a cooperating pair in scissors-fashion on a support member and are operable by means of a ram connected to said blades by links. It is of manufacturing and economic advantage to make the blades of the pair identical to each other.

BRIEF DESCRIPTION OF DRAWINGS

The invention will now be described by way of example with reference to the accompanying drawing in which.

DESCRIPTION OF PREFERRED EMBODIMENT

Figure 1A:
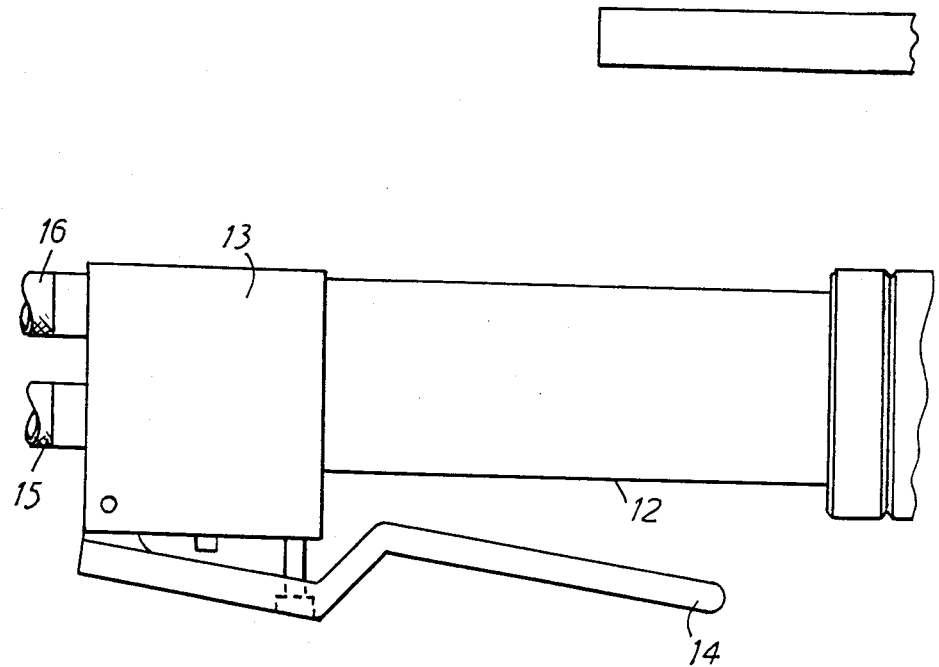
FIGS. 1A and 1B show an elevation of the cutter.
Figure 2A:
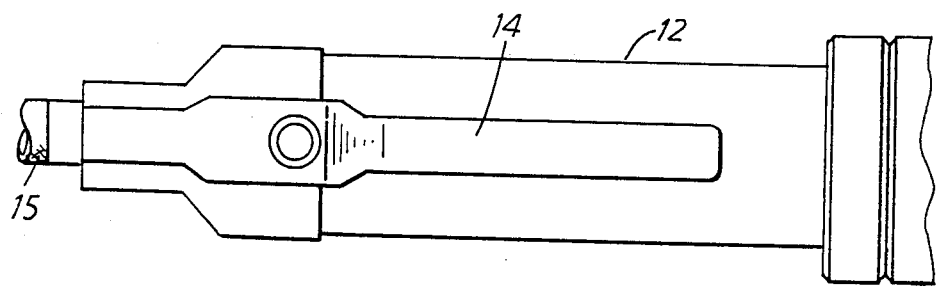
FIGS. 2A and 2B show an under plan view.

The hydraulic tube cutter shown in the drawings is constructed using a hydraulic ram assembly of the kind used for a vehicle rescue pillar cutter, adapted by means of the present invention. The ram assembly 9 comprises a blade support member or head 10 carried and secured by a thread on one end of a ram cylinder 12, at the other end of which is a valve assembly 13 which can be actuated by a lever 14. A supply of hydraulic fluid is provided through flexible hoses 15, 16. On actuation of the valve fluid pressure, which when the tool is not in use passes from one hose to the other through a communicating aperture (not shown) within the valve assembly, is applied to the piston (not shown) of the ram assembly. A rod 17 of the ram assembly moves within the cylinder and thus actuates a pair of cutter blades 18, 19 pivotally mounted on a bolt 20, located in aperture 20a by way of connecting links 21, 22 mounted on the rod by a common pin 23. Pivot pins 24 located within apertures 24a in the blade connect the links 21, 22 to the blades 18, 19.

The aperture 24a of each blade is disposed on an axis parallel at the axis of the pivot bolt 20, the axes of the two apertures in each blade being disposed on a line arranged at an angle of between 90 and 180 degrees to a line from the pivot axis to said piercing point such as to enable maximum moments of force to be achieved on operation of the links by the ram.

Figure 1B:
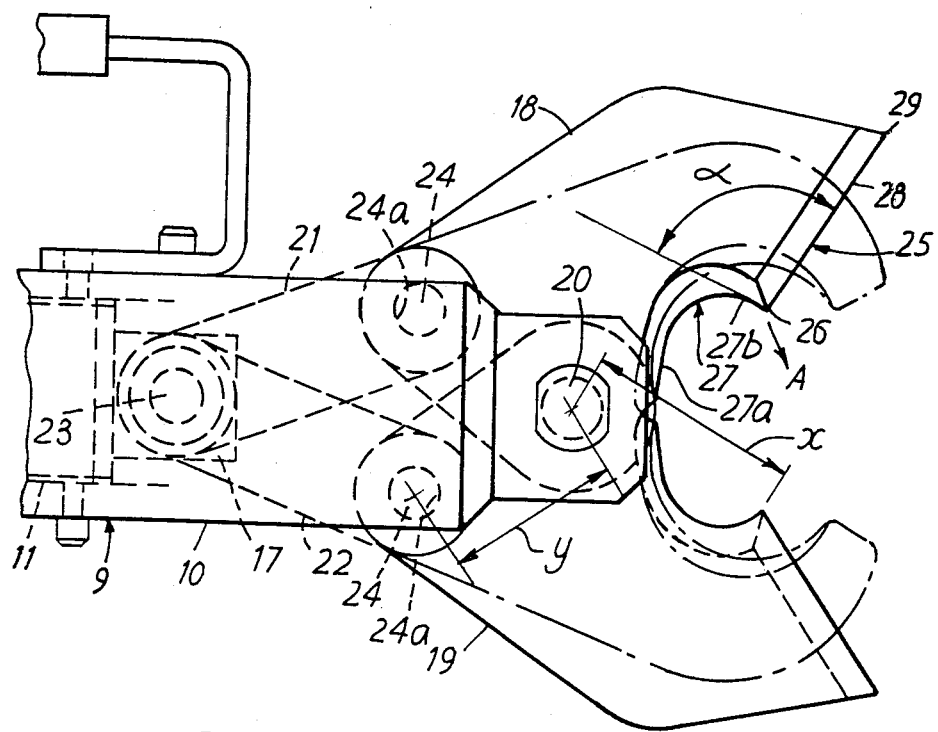
Figure 2B:
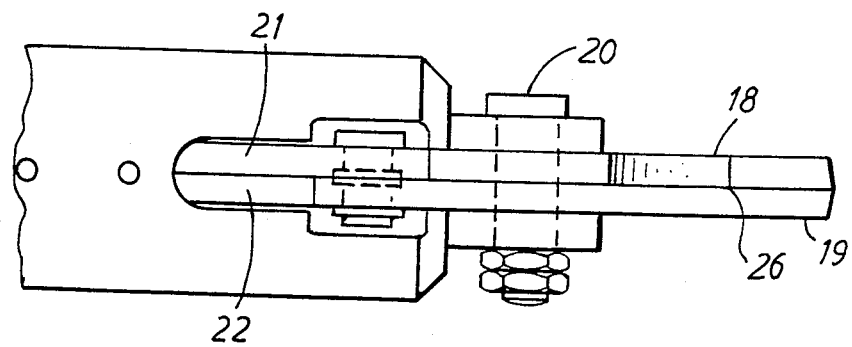
Figure 3:
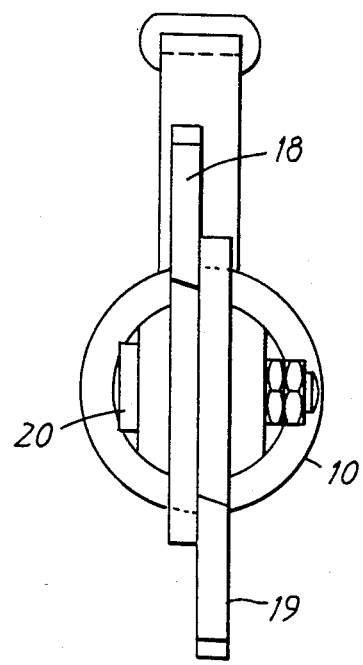
FIG. 3 is an end elevation.
Figure 4:
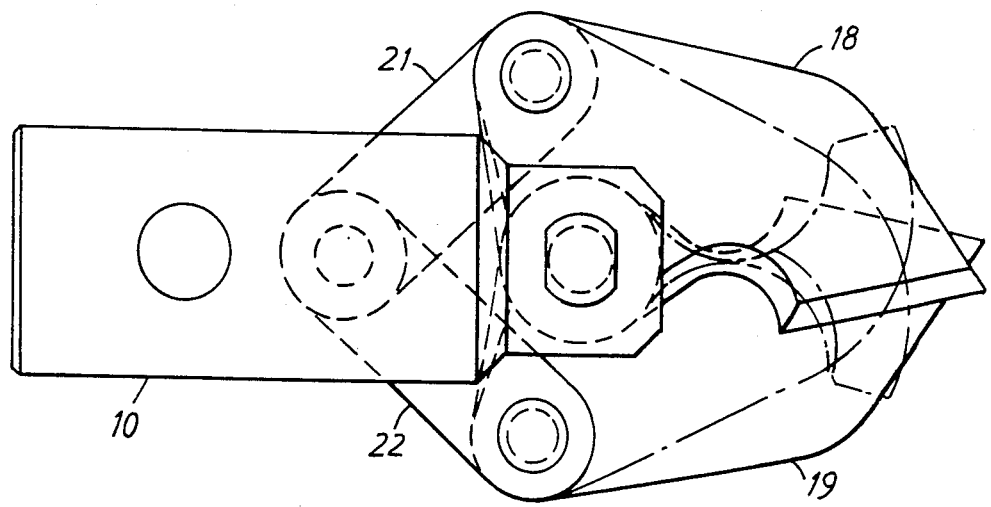
FIG. 4 shows a cutter head only with the cutter blades in the closed position at the end of a cutting operation.

For the sake of comparison cutter blades of a known cutter are shown in chain lines in FIG. 1. It will be seen from the drawing that the known blades each comprise a cutting edge which is formed as part of a circle and terminates in a blunt corner. The tips at the distal ends of the blades comprise flat faces.

However, in the present invention the blades are each formed with a cutting edge 25 having a piercing point (or short region) 26 having on each side portions 27, 28 which trail the leading extremity of the piercing point 26 considered in the direction of cutting shown by the arrow A. The piercing point is positioned substantially mid-way between the pivot bolt 20 and the furthermost extremity 29 of the portion 28. The portion 27 comprises a straight part 27a and a circular part 27b. The edge of the straight portion 28 and the tangent to the circular portion 27b at the piercing point may enclose an angle α of between 60 and 140 degrees but is preferably 100 degrees. The cutting edge 25 is formed by grinding the blade edge at an angle of between 30 degrees and 45 degrees to the major surfaces of the blade.

By providing a cutting edge formed with a piercing point and two trailing cutting edges (or in other words, cutting edges which sweep back from the piercing point) a pipe such as an exhaust pipe can be efficiently cut. The blades are positioned prior to cutting preferably across the diameter of the pipe. First the piercing point enters the opposite walls of the pipe so that an incision is made. As the pressure is applied to the blades the incision grows towards the side of the now partially flattened pipe.

As explained above, if as in the prior art, flattening takes place prior to cutting, a large force is required to effect the initial cut due to the thick bent over double edge and connecting bend. The important aspect to be considered in the present invention is the initial pressure needed to make the cut at the centre of the material to be cut which cut once started needs no increased pressure to maintain the progress of the shear effect.

Accordingly, an improved cutting effect is obtained with a less power (and less heavy) ram unit than would otherwise be required.

The reduction in force need is also achieved by the positioning of the piercing point whereby the moment of force required for the incision is reduced. If the piercing point were positioned too far from the fulcrum of the blade a greater force would be required. However, by reducing the distance x in relation to the distance y the initial cutting force required is reduced.

By so reducing the force required for cutting exhaust pipes the blades may be operated manually i.e., the blades of the present invention may replace those used in known bolt croppers. The blades in this construction may be pivotally mounted on one axis or alternatively on axes offset from each other.

Figure 5:
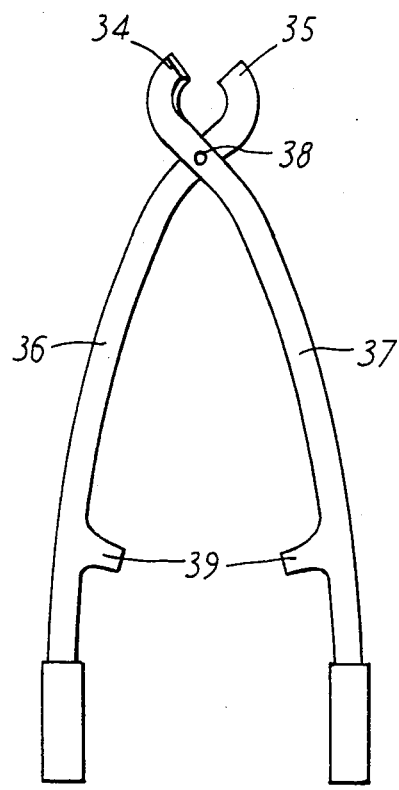
FIG. 5 shows a construction in which the blades are integrally formed with handles for manned operation.

In the arrangement shown in FIG. 5 blades 34, 35 having cutting edges of the kind described in the above examples, are integrally formed with handles 31, 37 for manual operation. The two blades are pivoted together on a common axis by a pivot pin 38. The handles are preferably provided with stops 39 to protect the operator's hands.

I claim:

1. In a cutting tool, for cutting hollow tubular members of predetermined annular wall thickness and predetermined diameter, comprising a pair of planar opposed blade bodies, pivotally connected at a common blade pivot for relative movement with respect to each other between an open position and a closed position and receivable of an object to be cut therebetween in said open position, each said blade body comprising a substantially planar body having an outer extremity remote from said common blade pivot, the improvement comprising:

tube shearing means, on each of said blade bodies, for shearing the annular wall of the tubular member, said tube shearing means comprising a first cutting edge and a second cutting edge disposed to intersect and form an angle therebetween, said first cutting edge extending from proximate said common blade pivot to said intersection and comprising a circular portion nearest said intersection which merges tangentially with a straight portion proximate said common blade pivot, said second cutting edge extending from said intersection to said outer extremeity in a straight line, each of said circular portions having a center of curvature which is closer than the other center of curvature to its respective edge when said blade bodies are in said open position;

tube piercing means, on each of said blade bodies, for simultaneously piercing the annular wall of the tubular member at two diametrically opposed points, said tube piercing means movable into piercing engagement with said tubular member at said diametrically opposed points, said tube piercing means comprising a point formed by the apex of the angle between said first and second cutting edges;

said tube shearing means cooperating with said tube piercing means to shear the tube wall on opposite sides of each of said diametrically opposed points, whereby in operation after initial piercing of the annular wall of the tubular member, and on continued cutting, the incisions made by the tube piercing means each increase away from the initial pierced point toward the sides of the tubular member;

actuating means for pivotally moving said blade bodies relative to one another about said common blade pivot, said actuating means comprising a hydraulic cylinder having an axis, a piston member with said hydraulic cylinder, said piston member axially movable within said cylinder, two rigid links pivotally connected to respective blade bodies of said pair of opposed blade bodies, means for fixedly connecting said common blade pivot to said hydraulic cylinder, means for pivotally connecting said two rigid links to a common link pivot on said piston member, whereby axial movement of said piston member causes relative movement of said blade bodies with respect to each other about said common blade pivot;

said pair of opposed blade bodies disposed in at least partially overlying relationship proximate said common blade pivot, whereby in said open position, said outer extremities are spaced apart from one another, and, in said closed position, said outer extremities overlap one another, and, as said blade bodies move toward one another, said tube piercing means come into overlapping relation before said outer extremities.

2. The cutting tool as claimed in claim 1, wherein said second cutting edge and the tangent, extending into the blade body, to the circular portion of the first cutting edge, at said intersection, form an angle between 60 and 140 degrees.

3. The cutting tool as claimed in claim 1, wherein each cutting edge is raked at an angle of from 30° to 45° to the plane of the blade body.

4. In a cutting tool, for cutting hollow tubular members of predetermined annular wall thickness and predetermined diameter, comprising a pair of planar opposed blade bodies, pivotally connected at a common blade pivot for relative movement with respect to each other between an open position and a closed position and receivable of an object to be cut therebetween in said open position, each said blade body comprising a substantially planar body having an outer extremity remote from said common blade pivot, the improvement comprising:

tube shearing means, on each of said blade bodies, for shearing the annular wall of the tubular member, said tube shearing means comprising a first cutting edge and a second cutting edge disposed to intersect and form an angle therebetween, said first cutting edge extending from proximate said common blade pivot to said intersection and comprising a circular portion nearest said intersection which merges tangentially with a straight portion proximate said common blade pivot, said second cutting edge extending from said intersection to said outer extremity in a straight line, each of said circular portions having a center of curvature which is closer than the other center of curvature to its respective edge when said blade bodies are in said open position;

tube piercing means, on each of said blade bodies, for simultaneously piercing the annular wall of the tubular member at two diametrically opposed points, said tube piercing means movable into piercing engagement with said tubular member at said diametrically opposed points, said tube piercing means comprising a point formed by the apex of the angle between said first and second cutting edges;

said tube shearing means cooperating with said tube piercing means to shear the tube wall on opposite sides of each of said diametrically opposed points, whereby in operation after initial piercing of the annular wall of the tubular member, and on continued cutting, the incisions made by the tube piercing means each increase away from the initial pierced point toward the sides of the tubular member;

actuating means for pivotally moving said blade bodies relative to one another about said common blade pivot;

said pair of opposed blade bodies disposed in at least partially overlying relationship proximate said common blade pivot, whereby in said open position, said outer extremities are spaced apart from one another, and, in said closed position, said outer extremities overlap one another, and, as said blade bodies move toward one another, said tube piercing means come into overlapping relation before said outer extremities.

5. The cutting tool as claimed in claim 4, wherein said second cutting edge and the tangent, extending into the blade body, to the circular portion of the first cutting edge, at said intersection form an angle between 60 and 140 degrees.

6. The cutting tool as claimed in claim 4, wherein each cutting edge is raked at an angle of from 30° to 45° to the plane of the blade body.

7. The cutting tool as claimed in claim 4, wherein said actuating means comprises, on each blade body, a handle portion located on the opposite side of said common blade pivot from said outer extremity, said handle portion adapted for manual operation of the cutting tool.

* * * * *